United States Patent [19]
Linquist et al.

[11] Patent Number: 5,483,665
[45] Date of Patent: Jan. 9, 1996

[54] SIMULCAST SATELLITE PAGING SYSTEM WITH OVER LAPPING PAGING RECEPTION LOCALES

[75] Inventors: Roger D. Linquist; Malcolm M. Lorang, both of Dallas, Tex.

[73] Assignee: Pagemart, Inc., Dallas, Tex.

[21] Appl. No.: 252,455

[22] Filed: Jun. 1, 1994

Related U.S. Application Data

[63] Continuation of Ser. No. 111,723, Aug. 24, 1993, Pat. No. 5,355,529, which is a continuation of Ser. No. 612,064, Nov. 13, 1990, Pat. No. 5,239,671.

[51] Int. Cl.$^6$ ............................... H04B 7/19; H04B 7/24
[52] U.S. Cl. .................. 455/13.1; 455/33.4; 455/51.2; 455/56.1
[58] Field of Search ............................ 455/12.1, 13.1, 455/13.2, 33.4, 51.1, 51.2, 54.1, 56.1; 340/311.1, 825.44; 370/100.1, 104.1, 108; 375/107

[56] References Cited

U.S. PATENT DOCUMENTS

| | | |
|---|---|---|
| H610 | 3/1989 | Focarile et al. . |
| 2,509,237 | 5/1950 | Labin et al. . |
| 3,646,444 | 2/1972 | Bitzer . |
| 3,995,111 | 11/1976 | Tsuji et al. . |
| 4,188,582 | 2/1980 | Cannalte et al. . |
| 4,232,392 | 11/1980 | French ................................. 455/105 |
| 4,255,814 | 3/1981 | Osborn ................................. 455/51.1 |

(List continued on next page.)

FOREIGN PATENT DOCUMENTS

| | | |
|---|---|---|
| 0167458 | 7/1985 | European Pat. Off. . |
| 0174540 | 3/1986 | European Pat. Off. . |
| 0281150 | 9/1988 | European Pat. Off. . |
| 2438457A1 | 2/1976 | Germany . |
| 52-7618 | 1/1977 | Japan . |
| 63-129731 | 2/1988 | Japan . |
| 2151135 | 11/1990 | Japan . |
| WO87/00994 | 6/1986 | WIPO . |
| WO91/07022 | 5/1991 | WIPO . |

OTHER PUBLICATIONS

Ritter, Steven and J. McCoy, "Automatic Vehicle Location—An Overview", *IEEE Trans. on Veh. Tec.,* vol. VT–26, No. 1, Feb. 1977, pp. 7–9.

Kihara, M., "Performance Aspects of Reference Clock Distribution for Evolving Digital Networks", *IEEE Communications Magazine,* Apr. 1989.

*Telocator Bulletin, News and Analysis for the Mobile Telecommunications Industry,* vol. 91, No. 3, Jun. 25, 1991.

Cox, D. C., "Universal Digital Portable Radio Communications", *Proc. of the IEEE,* vol. 75, No. 4, Apr. 1987, pp. 436–477.

"Unwanted Calls? Turn on Pager Phone," *USA Today,* Dec. 28, 1990, p. 8B.

Gardner, W. A. and Chen, C. K., "Inteference–Tolerant Time–Difference–Arrival Estimation for Modulated Signals", *IEEE Trans. on Acous., Speech and Sig. Proc.,* vol. 36, No. 9, Sep. 1988, pp. 1385–1395.

*Primary Examiner*—Chi H. Pham
*Attorney, Agent, or Firm*—Baker & Botts

[57] ABSTRACT

A paging system includes a satellite uplink (40) for assembling paging information and transmitting it to a satellite (26). The satellite (26) is then operable to transmit in a simulcast manner all the information to various regional paging systems (42). Each of the paging systems (42) includes a plurality of towers (10) each containing a satellite receiver (50), a satellite dish (48) associated therewith and a paging transmitter (52). Each of the satellite receivers (50) are operable to receive the information transmitted from the satellite (26) at substantially the same time such that there is no phase difference between any of the towers, regardless of location. Therefore, the transmitters (50) can transmit through antennas (12) information at the paging frequency with substantially no relative delays relative to each of the antennas (12). A backup link receiver (28) is provided for interfacing with a backup link transmitter (70). In the event of a failure of the receivers (50) or the satellite (26), the link transmitter (70) will transmit the paging information directly to select ones of the towers (10) over a separate frequency.

2 Claims, 6 Drawing Sheets

U.S. PATENT DOCUMENTS

| | | | |
|---|---|---|---|
| 4,287,597 | 9/1981 | Paynter et al. | 455/12.1 |
| 4,398,192 | 8/1983 | Barnes et al. . | |
| 4,479,245 | 10/1984 | Batlivala et al. | 455/18 |
| 4,516,269 | 5/1985 | Krinock | 455/51 |
| 4,525,685 | 6/1985 | Hesselberth et al. | 331/10 |
| 4,639,937 | 1/1987 | McRae et al. | 375/40 |
| 4,696,051 | 9/1987 | Breeden | 455/33 |
| 4,696,052 | 9/1987 | Breeden | 455/51.1 |
| 4,709,401 | 11/1987 | Akerberg | 455/51.1 |
| 4,709,402 | 11/1987 | Akerberg | 455/51.1 |
| 4,718,109 | 1/1988 | Breeden et al. | 455/51.1 |
| 4,745,599 | 5/1988 | Raychaudhuri . | |
| 4,747,120 | 5/1988 | Foley . | |
| 4,747,122 | 5/1988 | Bhagat et al. . | |
| 4,829,554 | 5/1989 | Barnes et al. . | |
| 4,850,032 | 7/1989 | Freeburg | 455/51.1 |
| 4,882,739 | 11/1989 | Potash et al. | 375/109 |
| 4,903,321 | 2/1990 | Hall et al. | 455/34 |
| 4,912,756 | 3/1990 | Hop | 379/60 |
| 4,918,437 | 4/1990 | Jasinski et al. . | |
| 4,943,803 | 7/1990 | Vrijakorte . | |
| 4,968,966 | 11/1990 | Jasinski et al. . | |
| 5,010,317 | 4/1991 | Schwendeman et al. | 340/311.1 |
| 5,031,230 | 7/1991 | Sandahl et al. | 455/50 |
| 5,047,762 | 9/1991 | Bruckert | 340/825 |
| 5,047,763 | 9/1991 | Kuznicki et al. . | |
| 5,129,096 | 7/1992 | Burns | 455/18 |
| 5,239,670 | 8/1993 | Schwendeman et al. | 455/13.1 |
| 5,239,671 | 8/1993 | Linquist et al. | 455/13.1 |
| 5,355,514 | 10/1994 | Borg | 455/33.1 |

SIMULCAST SATELLITE PAGING SYSTEM WITH OVER LAPPING PAGING RECEPTION LOCALES

This application is a continuation of U.S. patent application Ser. No. 08/111,723, filed Aug. 24, 1993 now U.S. Pat. No. 5,355,529, entitled PAGING SYSTEM WITH SATELLITE TIME BASE, which is a continuation of Ser. No. 612,064, Nov. 13, 1990, now U.S. Pat. No. 5,239,671, issued Aug. 24, 1993, entitled SIMULCAST SATELLITE PAGING SYSTEM WITH PROVISION FOR SIGNAL INTERRUPTION.

TECHNICAL FIELD OF THE INVENTION

The present invention pertains in general to a paging system, and more particularly, to a satellite link for transmitting directly to paging transmitters at select paging sites to provide a simulcast transmission with virtually zero phase shift between transmitters within the footprint of the satellite.

BACKGROUND OF THE INVENTION

Paging systems have conventionally utilized a number of data links to transmit paging information from a central paging terminal to select pagers. Typically, paging information is coded with a unique identification number and then transmitted to all paging receivers, with the receivers only receiving information having a specific identification number associated therewith. However, paging transmitters can be located in any locale with the primary objective of a paging system being to deliver the signals to all paging receivers at virtually the same time in what is sometimes referred to as a Simultaneous Broadcast mode, or "simulcast".

In order to effect a simultaneous broadcast of the information, a radio link is provided with the information modulated onto a carrier and then the carrier transmitted to all the paging receivers. However, due to practical constraints, multiple paging transmitters are required at any given locale to provide sufficient coverage. Therefore, one problem that has been presented in the design of paging systems is that of independently transmitting from a plurality of transmitting antennas. It can be appreciated that when a receiver is proximate to one transmitter in an array of transmitters, the receiver will lock on to the stronger signal. However, a problem arises when a receiver is disposed equidistant between two transmitters with the power from each of the two transmitters being essentially the same magnitude. In this situation, data is being simultaneously received from two transmitters, and the phase difference between the data received from both transmitters must be relatively close. If not, an error may occur. It is accepted in the industry that any phase difference between two transmitters that would result in greater than one-half bit difference in the data received at a receiver midway between the two transmitters would cause an error in the reception of the data. Therefore, data transmitted from the two transmitters must be phased such that a smaller error is present.

In conventional systems, information is typically received at a paging terminal and then transmitted to the separate paging transmitters through either land lines or a radio control link. With land lines, there are delays inherent in the land line and, in the radio control links, delays occur as a result of path length, atmospheric conditions, etc. In each of these systems, some adjustment in phase must be made at the paging transmitter location to compensate for this phase. This is a conventional method, but does present problems in that the phase "drifts" over time as a function of degradation and parts, change in atmospheric conditions, etc. Therefore, the phase at each of the paging transmitters must be adjusted on a periodic basis.

In some conventional systems, the link between the paging terminal and the radio controlled link to the paging transmitters can be a satellite link. Typically, the paging terminal is connected to a satellite uplink which transmits the information to the satellite when a separate receiver is disposed elsewhere to receive the satellite information, decode it and modulate it onto the carrier of the radio control link for transmission to the paging transmitters. Typically, the radio control link is a "line of sight" link that has a large number of disadvantages with respect to terrain, atmosphere conditions, etc. Another disadvantage is that specific frequencies must be obtained from the appropriate regulatory bodies in order to utilize the radio controlled link. In crowded areas, these are difficult to obtain, due to the high demand for the various channels.

SUMMARY OF THE INVENTION

The present invention disclosed and claimed herein comprises a paging system. The paging system includes a satellite having a predetermined footprint for transmitting on a downlink channel timing and paging information. A plurality of paging sites are provided that are disposed in the footprint of the satellite. At each of the paging sites, a satellite receiver is disposed for receiving the paging information for the satellite. The paging information received at each of the satellite receivers is received at substantially the same time. A paging transmitter is disposed at each of the paging sites for receiving the paging information on the output of the satellite receiver and transmitting the received paging information on a paging frequency in accordance with the received timing information within a predetermined locale proximate to each of the paging sites. A paging receiver is then operable to receive the paging information from the paging transmitter when it is within the locale of an associated one of the paging transmitters. The predetermined locale for adjacent ones of the paging sites have a substantial overlap such that if one of the paging transmitters fails in its associated predetermined, locale, the paging transmitter at the adjacent one of the paging sites will provide sufficient field strength to be received by a paging receiver in the predetermined locale associated with the failed one of the transmitters.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
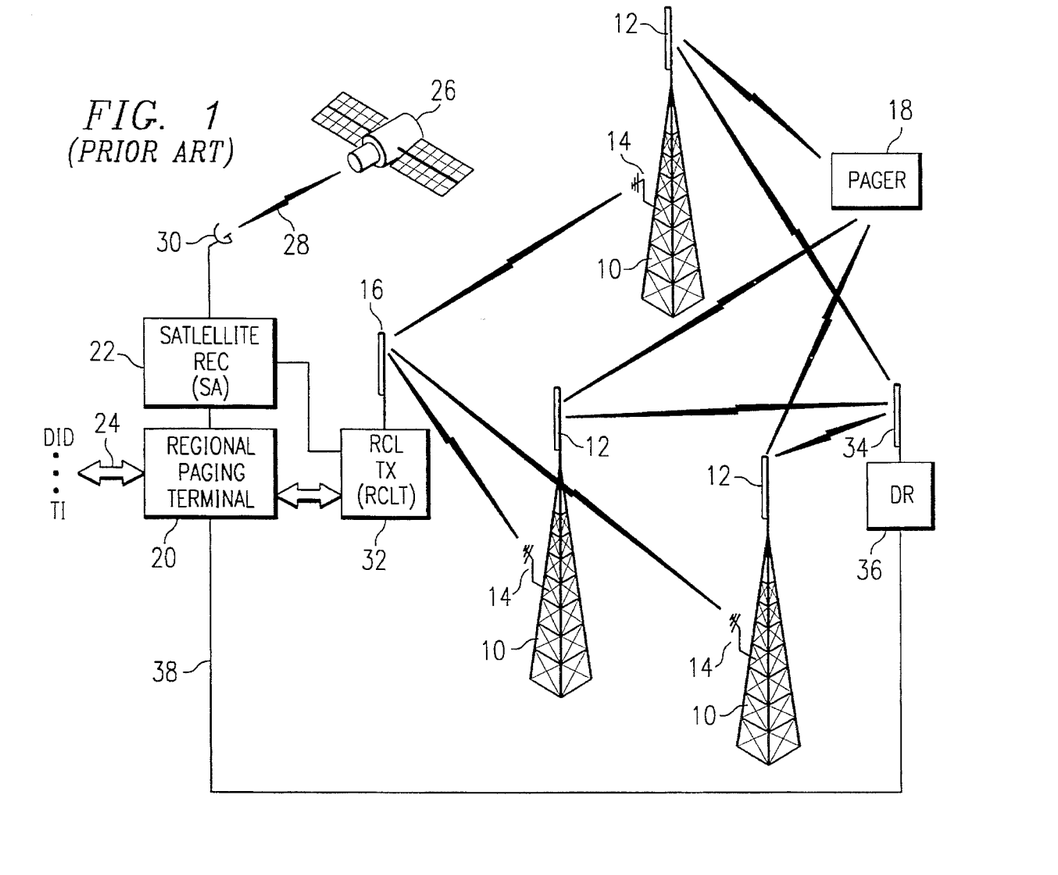
FIG. 1 illustrates a diagrammatic view of a prior art system.

Referring now to FIG. 1, there is illustrated a diagrammatic view of the prior art paging system. The paging system includes a plurality of antenna towers 10 that are disposed at select locations in a particular locale. The particular location in which any of the towers 10 is located is a function of the desired coverage of a given system. Each of the towers 10 has disposed thereon a paging transmitter antenna 12 and a radio control link (RCL) receiving antenna 14. Each of the RCL receiving antennas 14 is operable to receive from an RCL transmitting antenna 16 paging information that is converted to a paging frequency and transmitted out from the paging antennas 12 to a pager 18. The pager 18 can be anywhere within the transmitting locale of any of the paging antennas 12, which transmitting locale is defined as the maximum distance at which the signal can be received by a receiver.

A regional paging terminal 20 is provided for receiving message information from either a satellite receiver 22 or a DID telephone line 24. The message information received by the paging terminal 20 consists of messages that are directed toward users of the systems through their associated pagers 18. The information is received from telephones in a public telephone network and then coded at a central location and transmitted to the paging terminal 20 through either a satellite link or the telephone trunk 24.

The satellite link consists of a geosynchronous satellite 26 which transmits the information through a downlink 28 to the satellite receiver 22 via a receiving antenna 30. The information transmitted to the satellite 26 is transmitted from the central location (not shown) through a separate uplink. By utilizing the satellite 26, a number of regional paging terminals 20 can have information transmitted thereto.

After receiving the message information, the paging terminal 20 outputs the information to a radio controlled transmitter (RCLT) 32. This is then transmitted to all of the paging antennas 12 through the RCL transmitting antenna 16. In addition to the paging antennas 12, a diagnostic receiving antenna 34 is provided that is connected to a diagnostic receiver (DR) 36. The antenna 34 is disposed within the field of a number of the paging antennas 12 to receive transmissions therefrom and process them through conventional diagnostic routines. This information is transmitted back to the paging terminal 20 through a land line 38.

One disadvantage to the prior art system is that the path length between the transmitting antenna 16 and the RCL receiving antenna 14 varies. In addition, the delay associated with transmission through a medium such as air varies as a result of atmospheric conditions, terrain, etc. It is important that the data is transmitted from each of the paging antennas 12 at approximately the same time such that when one of the pagers 18 is disposed equidistance between two of the transmitters 12, such that the signal level is essentially equal, there will be no phase difference between the two received signals. This is an important aspect of any simulcast. In order to adjust for the phase, the conventional receiver/transmitter associated with each of the towers 10 has some delay adjustment associated therewith. This delay adjustment varies over time and with seasons and, as such, periodic maintenance is required on each of the towers 10 to insure that this phasing is correct.

Figure 2:
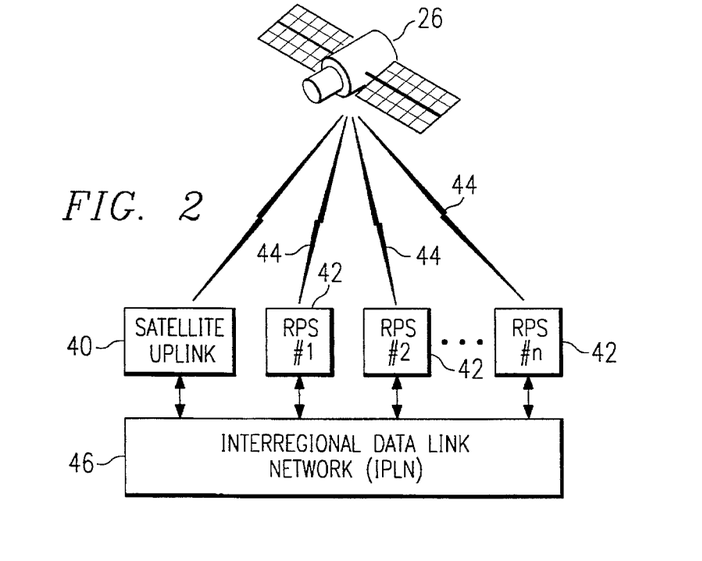
FIG. 2 illustrates a block diagram of the system of the present invention.

Referring now to FIG. 2, there is illustrated a block diagram of the paging system of the present invention. The geosynchronous satellite 26 is utilized to receive from a satellite uplink 40 the paging information. This is distributed to regional paging systems (RPS) 42 through a downlink 44. Each of the RPSs 42 are connected to an interregional data link network (IDLN) 46, which is operable to connect all of the RPSs 42 and the satellite uplink 40.

Figure 3:
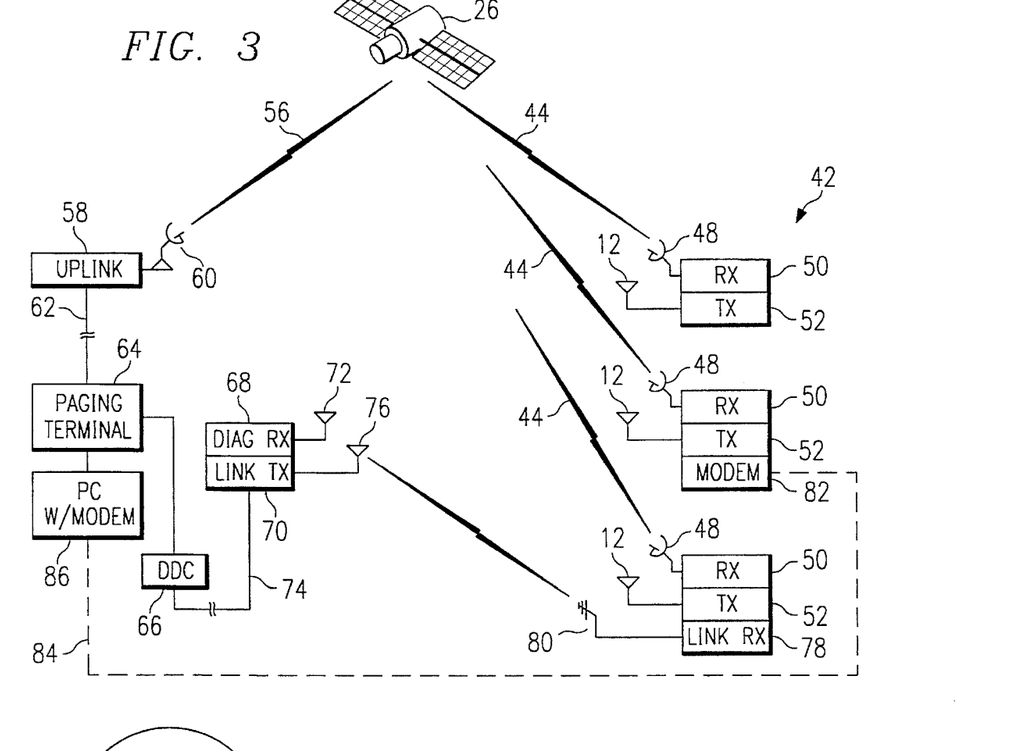
FIG. 3 illustrates a diagrammatic view of the simulcast operation of the present system.

Referring now to FIG. 3, there is illustrated a block diagram of one of the regional paging systems 42. Each of the towers 10 has associated therewith a satellite receiving antenna 48 and a satellite receiver 50. In the preferred embodiment, the satellite 26 and the associated downlink 44 operate in the Ku-band. In addition, each of the towers 10 has a paging transmitter 52 associated therewith that transmits a simulcast signal out through the paging antenna 12 associated therewith.

The satellite 26 receives the message information on an uplink 56 from an uplink station 58. The uplink station 58 transmits the information to the uplink 56 through a satellite dish 60 on the dedicated uplink channel. The uplink 58 and its associated satellite link 60 are typically located in a central location with all of the information transmitted thereto on a land based line 62. The land based line 62 is interfaced with a paging terminal 64 that is disposed at the location of the regional paging system 42. The paging terminal 64 is operable to interface with the uplink 58 to transmit local phone calls with message information to the uplink 58 for transmission up to the satellite 26, and also to perform certain diagnostic functions.

The paging terminal 64 is interfaced through a Digital Diagnostic Controller (DDC) 66 to a diagnostic receiver 68 and a link transmitter 70. The diagnostic receiver 68 has a receiving antenna 72 for receiving transmissions from the paging antennas 12 and transmitting the information back to the DDC 66 through a land based line 74. The link transmitter 70 is operable as a backup to transmit the paging information through a transmitting antenna 76 to a link receiver 78 that is operable to receive the transmitted information on a link receiving antenna 80. Therefore, a radio controlled link is provided by the link transmitter 70 and the link receiver 78. The link receiver 78 is only associated when certain ones of the towers 10 that are determined to be critical to operation in the event that satellite transmission fails. This can occur as a result of a satellite going down, the uplink failing, etc.

The system of FIG. 3 has a number of advantages in that the satellite signal is directly transmitted to each of the towers 10. This provides a significant advantage in that the footprint of the satellite and the inherent characteristics thereof result in a zero time difference between receipt of the data at each of the satellite antennas 48. As such, no delay need be accounted for when transmitting the information from the paging transmitters 52 on the paging antennas 12. Therefore, it can be assumed that the signals have been transmitted from the towers 10 and the associated paging transmitters 52 on an equal phase and equal time basis.

Another advantage to utilizing this type of system is that no additional radio-controlled link hardware is required other than for backup. It is only necessary to place one of the satellite receivers 50 onto the tower 10 in association with the transmitter 52 and align the satellite dish 42 to provide optimum reception. No alignment of a radio controlled link is required and no delay adjustment is required, with the exception of the backup system, which is only disposed on a few of the towers 10. Further, no license from the appropriate regulatory bodies is required, nor are any intermodulation or RFI studies required.

For diagnostic purposes, a modem 82 can be associated with any of the satellite receivers 50 and paging transmitters 52 to provide diagnostic capabilities. This modem is connected through a land line 84 to a personal computer 86 having an associated modem. This personal computer 86 runs a diagnostic routine and interfaces with the paging terminal 64. This is a conventional system to allow the terminal 64 to interface with any one of the towers for diagnostic purposes.

Figure 4:
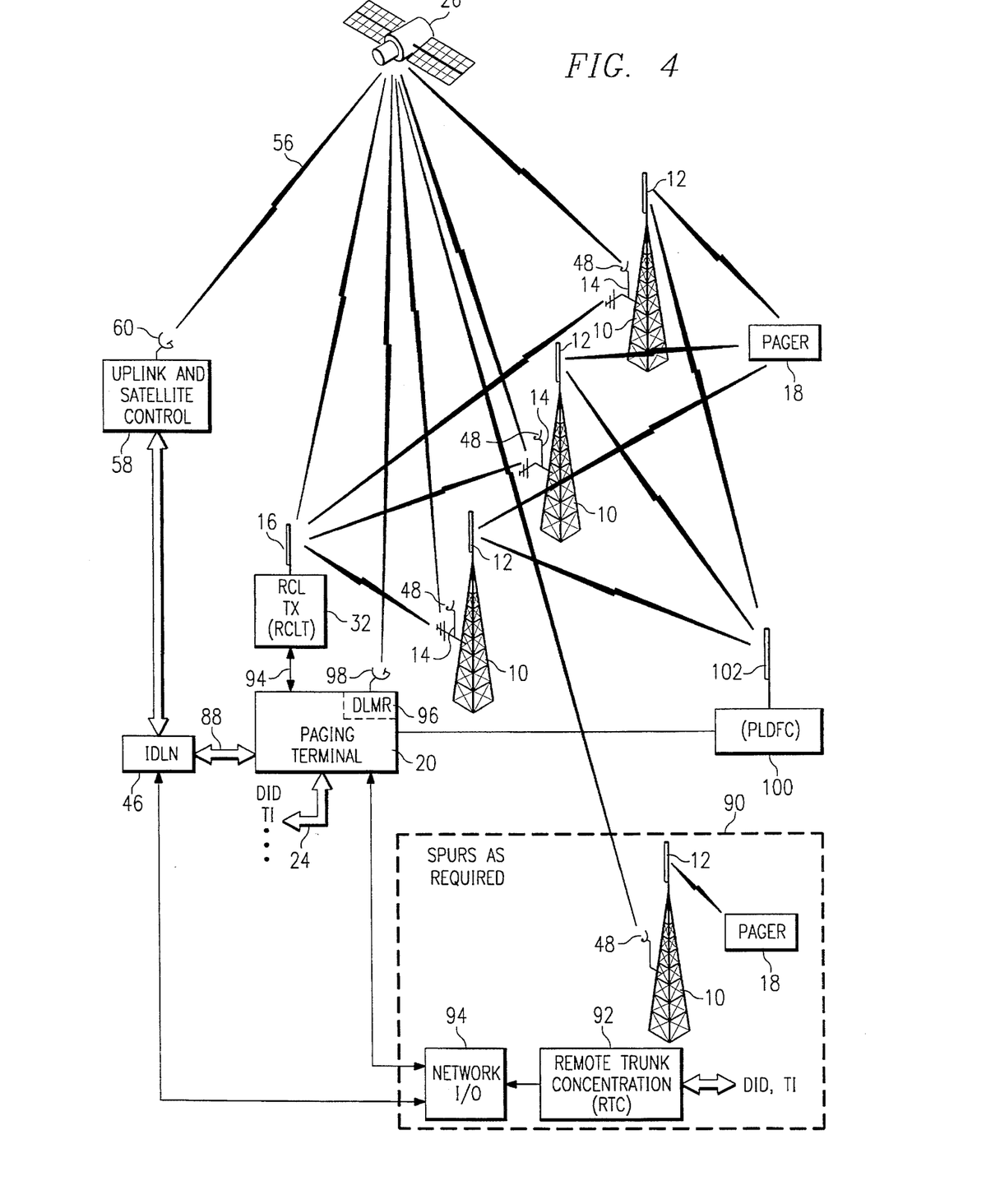
FIG. 4 illustrates a diagrammatic view of one of the regional paging systems of the present invention.

Referring now to FIG. 4, there is illustrated a diagrammatic view of the system of FIG. 3 illustrating the satellite receiving dishes 48 and the antenna towers 10. The antenna towers are illustrated in a particular region, the region controlled by the paging terminal 20. In operation, the paging terminal 20 is disposed in a particular region. The paging terminal 20 is interfaced with the local telephone system through the DID trunk 24. Telephone calls coming into the paging terminal 20 will allow an individual to access one of the users of the systems through their pager 18. The phone call is made and a message logged onto the paging terminal 20. These messages are queued up and then transferred to the IDLN 46 through a network trunk 88. This paging information is then queued up at the IDLN 46 and transmitted to the uplink and satellite control 58 for output on the satellite dish 60 to the satellite 26. All of the regions that are covered by the system are routed to the ID for transmission up to the satellite 26. The satellite 26 then transmits down to each of the satellite dishes 48 on the antenna towers 10 for each of the regions. Although separate regions are described, it should be understood that a single very large paging terminal could be utilized to receive the telephone calls and their associated messages for the various pagers 18. However, it is more efficient to provide some diversity with respect to the paging terminal and utilize a large number of them. This allows for a more efficient interface with the local telephone networks. If it is desired to communicate between regional paging terminals, TNPP network is utilized.

In certain regional systems, it is desirable to extend the reach of a given system to another area on a limited basis. These are referred to as "spurs". This is illustrated by a box with a dotted line 90. Spur 90 contains an antenna tower 10 having an associated satellite dish 48 and paging transmitter antenna 12. The local phone is fed into a remote concentrator (RTC) 92 to receive the phone calls at the local area. These are then transmitted to a network I/O 94 to interface the calls with the paging terminal 20 at a particular region or directly with the IDLN 46. In operation, a given spur 90 would be associated with a particular paging terminal. It would then only be necessary to somehow connect the phone call with the paging terminal 20 at its location. This could be accomplished merely by providing a long distance number such that the caller interfaced directly with paging terminal 20. However, from a marketing standpoint, it is more desirable to provide a local phone number and collect the calls and route them to either the IDLN 46 or the paging terminal 20. In any event, once the calls are collected and the messages organized, they are all routed to the IDLN 46 for transmission to the satellite.

In some situations, it may be desirable to have the regional systems occupy separate channels on the downlink 44. This can be accomplished by providing totally separate channels at the transmitter on satellite 26 or, more preferably, multiplexing a given channel for each regional paging system 42 in the system. This could utilize FDM, TDM and CDM modulation techniques. In this manner, the information received at the IDLN 46 can be discriminated into the various locales.

In one embodiment of the present invention, it is desirable to cover the entire footprint of the satellite 26 with antenna towers 10 having their associated satellite receivers and dishes 48 aligned with the satellite. In this manner, all the antenna towers 10 in the footprint can receive the satellite transmission encoded with the various messages and with an effective time difference of substantially "0". Therefore, all the antenna towers 10 in a given system could effectively receive all the pages to the entire system. The disadvantage to this system is with regard to throughput. Since the messages are output in a serial manner, a large number of pagers on a system would result in a large number of messages being queued up at peak times. When this occurs, it could take a significant amount of time for a message to reach its destination pager. Therefore, it is desirable to either utilize a plurality of channels from the satellite and divide the system up into regions or to use a single channel and time multiplex the channels with the system broken up into various regions. This will allow messages to be output in a parallel manner to more users at any given time.

The radio control link 32 is only directed to a number of key towers to minimize its overall expense. In operation, the RCL 32 provides a backup function that only utilized whenever it is determined that the satellite dish 48 is not receiving information from the satellite 26. In this mode, the local paging terminal 20 will activate the associated RCL 32 through an interconnecting control line, such as a local land line 94, to transmit the paging information directly to the antenna towers 10. In this mode, the information will not be transmitted down from the satellite 26 and received by the tower 10. However, it may still be transmitted to the uplink 58.

In addition to the RCL 32, there is also provided a diagnostic link monitoring receiver (DLMR) 96 that receives the transmission from the satellite 26 on a satellite dish 98. Satellite dish 98 is identical to the satellite dish 48, in addition to the associated satellite receiver 50 being similar. The DLMR 96 is operable to receive the transmission and compare it with the messages that were sent out to determine that the messages were, in fact, transmitted from the satellite. In addition, the DLMR 96 verifies that the satellite 26 is transmitting.

A second diagnostic function is provided by a PLDFC 100 that is disposed out in the field of the antenna towers 110. The PLDFC has a receiving antenna 102 associated therewith, which is identical to the transmitter antennas 12. It is operable to receive the actual transmission that a pager would receive to determine that the system is, in fact, operating.

Each of the satellite dishes 48, as described above, operates in the Ku-band. Although there are a number of different frequencies that could be utilized for interface with a satellite, the higher frequencies are more desirable due to the size of the dish that can be utilized therewith. C-band frequencies would not be desirable, as the satellite dishes associated therewith would be a minimum size of two meters. By comparison, the satellite dish 48 at Ku-band, as implemented in the preferred embodiment, is approximately 75 centimeters. At the largest, a dish of 1.2 centimeters is utilized. It can be appreciated that a significant reduction in installation cost results from the use of such a small dish, in addition to the fact that a dish over one meter is seldom allowable on any antenna tower 10. It should also be understood that an antenna tower 10 could be a building or any structure that is available to support a paging antenna. By utilizing the smaller dish, it is possible to gain access to these antenna towers for purposes of installation.

The RCL data bank provided by antenna 16 could be replaced by a redundant satellite uplink, satellite and satellite downlink. In this manner, failure of the primary transmission path could be replaced at select sites with the redundant systems. The select sites would have an appropriate receiver disposed thereat.

Figures 5, 11:
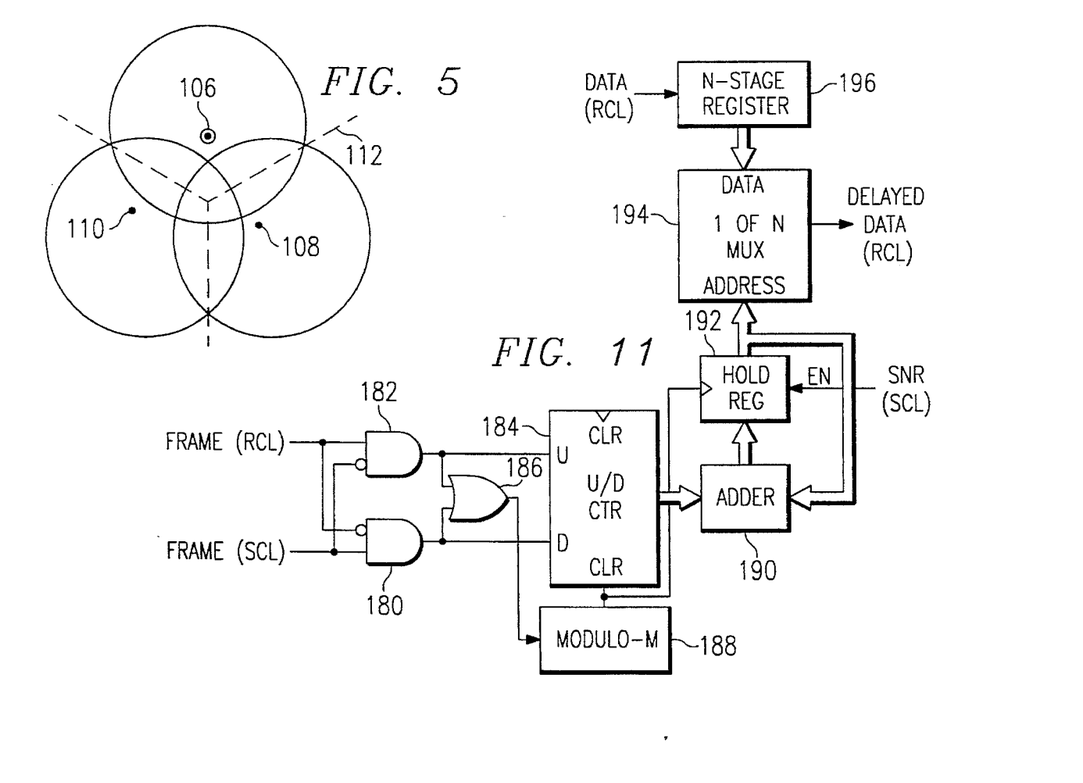
FIG. 5 illustrates a field strength pattern for three adjacent paging transmitters.
FIG. 11 illustrates a block diagram of the delay circuit for delaying the data received from the radio control link.

Referring now to FIG. 5, there is illustrated a diagrammatic view of the transmission fields for three adjacent transmission paging sites 106, 108 and 110. Each of these sites is a location of an antenna tower 10 and associated paging transmitter antenna 12. In the preferred embodiment, the Ku-band system is utilized which can have problems with "fade". This phenomenon is somewhat exacerbated at Ku-band and is present whenever heavy thunderstorms appear. In this condition, severe attenuation results in the loss of signal to any one of the given receiving antenna 48. This could be disastrous to the integrity of a system, since any one antenna failure at a paging transmitter 12 would result in loss of coverage at that particular paging transmitter 50 and associated tower 10. To compensate for this, the antenna towers 10 are disposed to provide a significant amount of overlap in the respective transmission fields which is substantially more than is normally incurred. In conventional systems, it is desirable to have some overlap at the minimum signal strength in the coverage provided by a given paging transmitter, i.e. at the fringe; in order to ensure that there is adequate coverage of the area. However, in the present system, the rain fade associated with a Ku-band satellite link is offset by providing this overlap. In this manner, a given paging transmitter can fail with an adjacent transmitter providing coverage out of that particular area.

With further reference to FIG. 5, it can be seen that the overlap is such between the transmitters 106–110 such that if one of the towers, for example, tower 106, were to fail, the coverage provided by the remaining two towers 108 and 110 would cover an individual pager 18 disposed therebetween. With respect to interference problems, the only place that an individual pager 18 would have an interference problem would be midway between any of the paging sites 106–110. This is illustrated by a dotted line 112 that represents the midway point between all three paging sites. At any one of these points along line 112, it is possible for the pager 18 to receive data from two of the paging sites simultaneously. Of course, there will be one point where it is possible for the pager 18 to receive energy from more than two towers. For this reason, it is important that the time difference between transmissions from each of the paging sites 106–110 be substantially identical.

Figure 6:
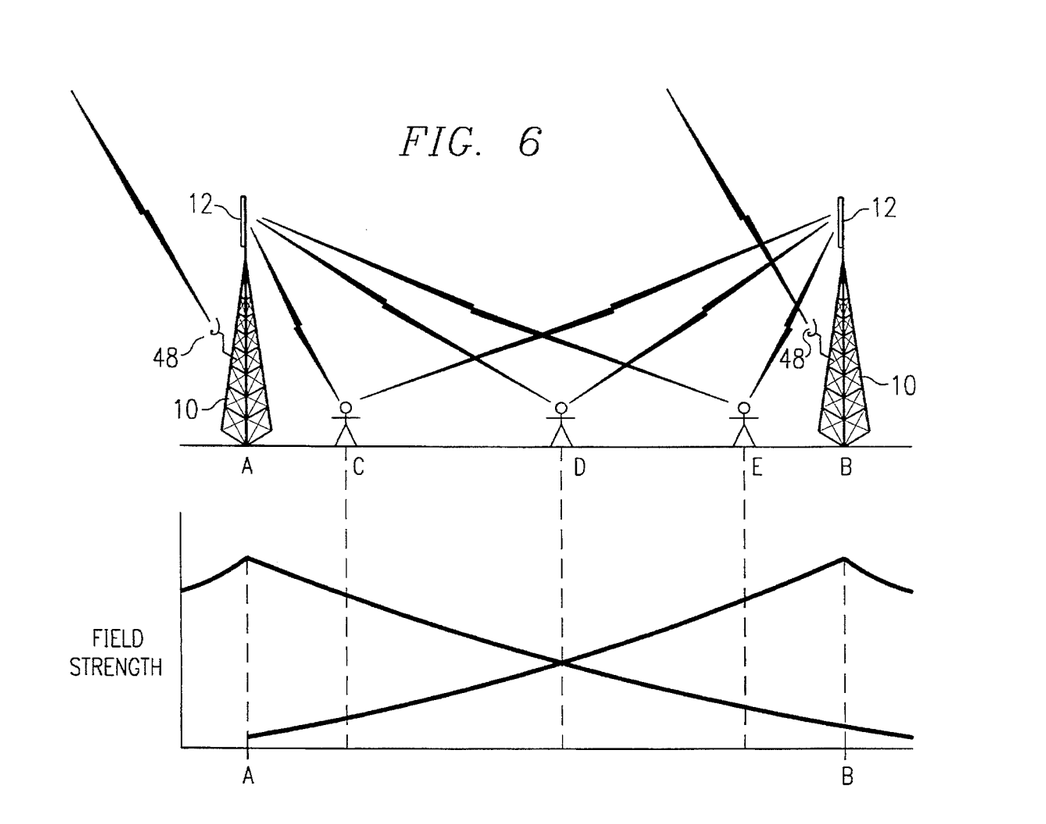
FIG. 6 illustrates a diagrammatic view of the field strength for two of the paging transmitters.

Referring now to FIG. 6, there are illustrated two towers 10 at two different locations, A and B. In addition, there are illustrated three pager positions, C, D and E, disposed between the two towers 10 at positions A and B. Each of the towers 10 and the respective paging antenna 12 are operable to transmit the paging information to each of the paging locations, C, D and E and, therefore, the pager 18 must discriminate between the two signals. Since the pager utilizes an FM receiver, it will capture the stronger signal and reject the weaker signal, therefore minimizing the problem of data contention and timing between the signals. However, at pager location D, which is equidistant between the two towers 10 at locations A and B, respectively, the field strength from each of the paging antennas 12 at locations A and B would be substantially identical. It is at this point that phasing is important. With the system of the present invention, the satellite dishes 48 receive a simulcast signal from the satellite 26 at substantially the same time. Therefore, it can be reasonably assured that there is no time difference between the signal output from each of the antennas 12 at locations A and B, and therefore, the time difference between data edges of the modulated data on the RF carriers will be substantially zero. This is illustrated with respect to the timing field strength diagram in the lower half of FIG. 6 wherein the field strength is illustrated at a peak at locations A and B and falling off in a predetermined manner as the pager 18 moves away from each of the respective locations A and B. However, it can also be seen that the field strength of the tower 10 and associated paging antenna 12 at location A is still sufficient for a paging receiver 18 to receive this information at location B if no energy were transmitted from the paging antenna 12 at location B. It is only when energy is transmitted from the paging antenna 12 at location B that the paging receiver 18 will select a signal over that received from the paging transmitter 52 at location A when the pager is proximate to location B.

The overlapping of signals can also be a problem with respect to timing when the two towers 10 at locations A and B are in different regions. In conventional systems, each region has its own time base and any adjustments to this time base are made on a region to region basis. At the periphery of each of the regions, it is possible that the reach of a given paging transmitter 52 will overlap into another region. If this happens, it is possible for a pager 18 to receive equal energy from a paging transmitter 52 on the periphery of one region and a paging transmitter 52 on the periphery of the other region. If this happens, there is no relationship between the two time bases and therefore, a high probability of error exists. Previous systems have utilized a "dead zone" disposed between two regions in order to prevent this. However, with the system of the present invention, no dead zone would be required as the zero time base is inherent even between adjacent regions.

Figure 7:
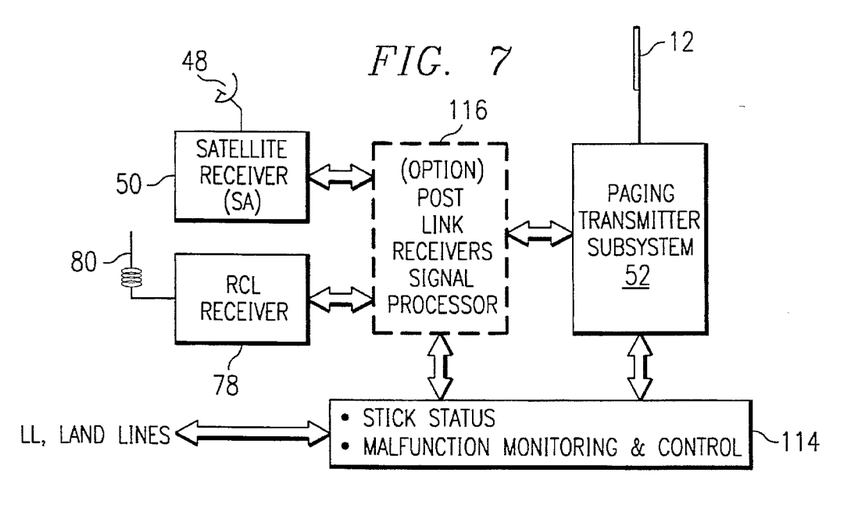
FIG. 7 illustrates a block diagram of a paging transmitter.

Referring now to FIG. 7, there is illustrated a block diagram of the paging transmitter 52, the satellite receiver 50 and monitoring equipment 114. The satellite receiver 50 is operable to receive information from the satellite 26 on the satellite dish 48 which is connected to a satellite receiver 50. This is then output to a post link receiving signal processor 116 that is operable to perform a number of functions that will be described hereinbelow in the form of signal conditioning. The signal processor 116 is also operable to receive the output of the RCL receiver 78 when it is associated with a particular site. The signal processor will select between the signal output by the satellite receiver 50 and the RCL receiver 78, and will select the output of RCL receiver 78 when the output of the satellite receiver 50 indicates that a failure has occurred at the satellite receiver, or at the satellite itself. The selected output will then be conditioned and input to the paging transmitter 52 for transmission on the paging antenna 12. In addition, various status and monitoring information is performed by the block 114 that allows the site to be linked with the control center through various landlines, networks, etc.

Figure 8:
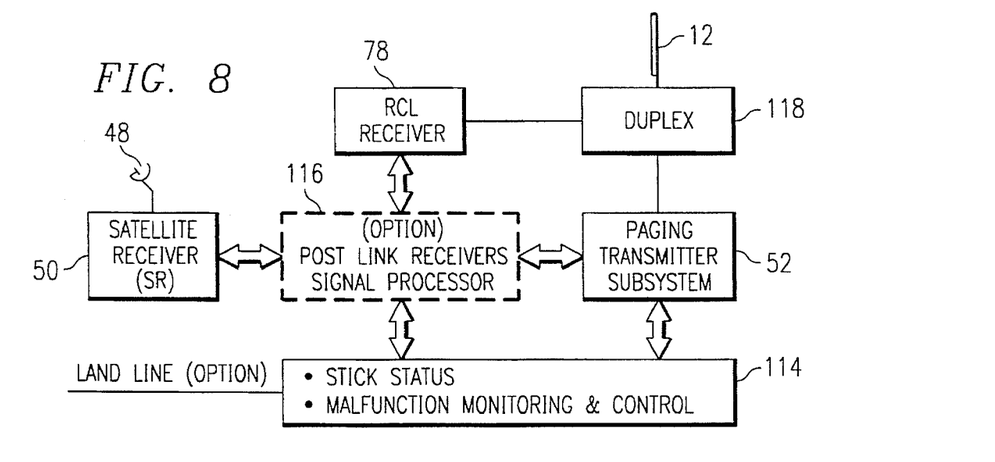
FIG. 8 illustrates a block diagram of a paging transmitter and radio control link antenna.

Referring now to FIG. 8, there is illustrated a similar system to that of FIG. 7, wherein the antenna utilized for the paging transmitter is duplexed in operation to also function as the RCL antenna 80. Therefore, the RCL antenna 80 is not utilized but, rather, the frequencies are such that reception can occur on the paging transmitter 12. A duplex circuit 118 is provided for isolating the transmitted energy of the paging transmitter 52 from the signal received at the RCL frequency for output to the RCL receiver 78.

Figure 9:
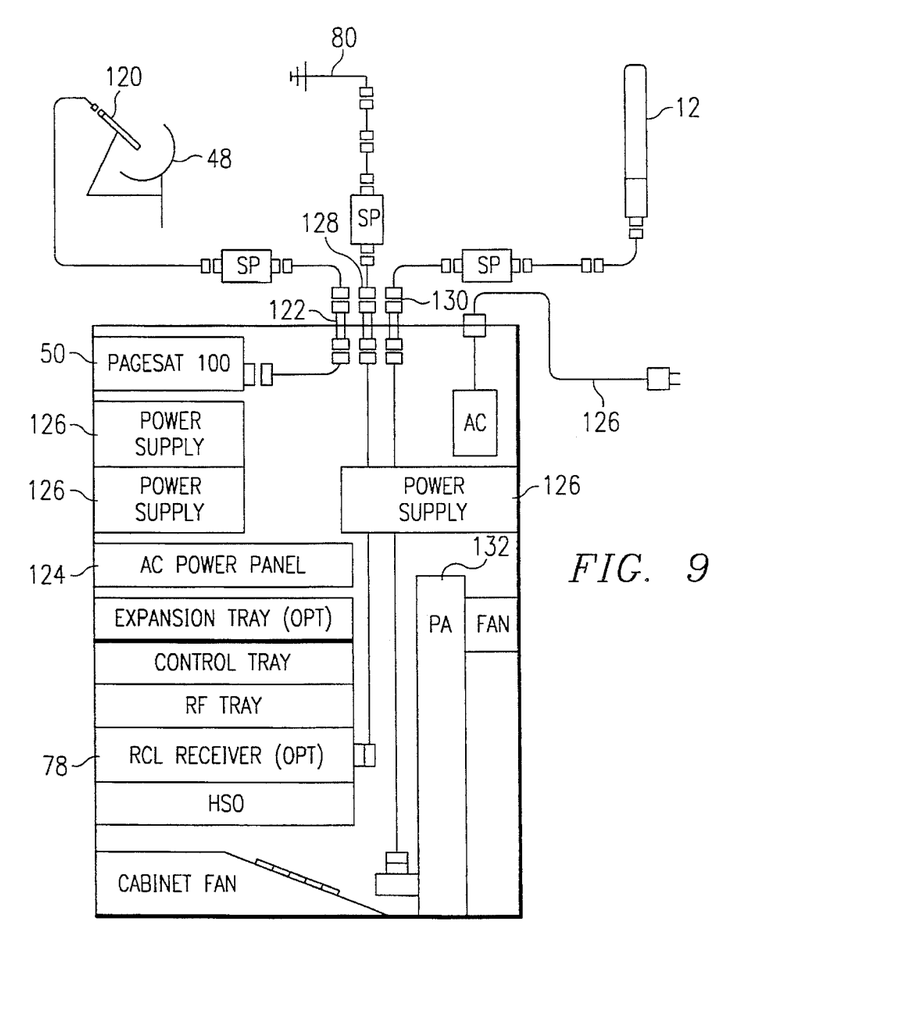
FIG. 9 illustrates a more detailed block diagram of the paging transmitter and radio control link receiver.

Referring now to FIG. 9, there is illustrated a more detailed diagram of the system of FIG. 7. The satellite dish 48 is a 0.75 meter Ku band dish manufactured by Channel Masters. It includes a feed 120 that is input to a connector 122 on a chassis 124. The chassis 124 is generally referred to as the PURC 5000 paging transmitter system manufactured by Motorola and contains the various functions that are necessary to configure a paging transmitter at a tower. The connector 122 is input to the satellite receiver 50 which is a PAGE SAT 100, manufactured by ISS Engineering, Inc. Three power supplies 126 are provided to power this system, these being interfaced through an AC power cable 126. The RCL receiver 78 (optional) is housed in housing 124 and interfaces through a connector 128 on the housing 124 to the RCL receiver antenna 80 that is a DB 230 manufactured by Decibel Products, Inc. In a similar manner, the paging transmitter antenna 12 is a DB 860, manufactured by Decibel Products, Inc., and is interfaced with the housing 124 through a connector 130, this being interfaced with a paging amplifier 132, internal to the housing 124. The system in housing 124, with the exception of the satellite receiver 50, is conventional and is utilized widely in the industry.

Figure 10:
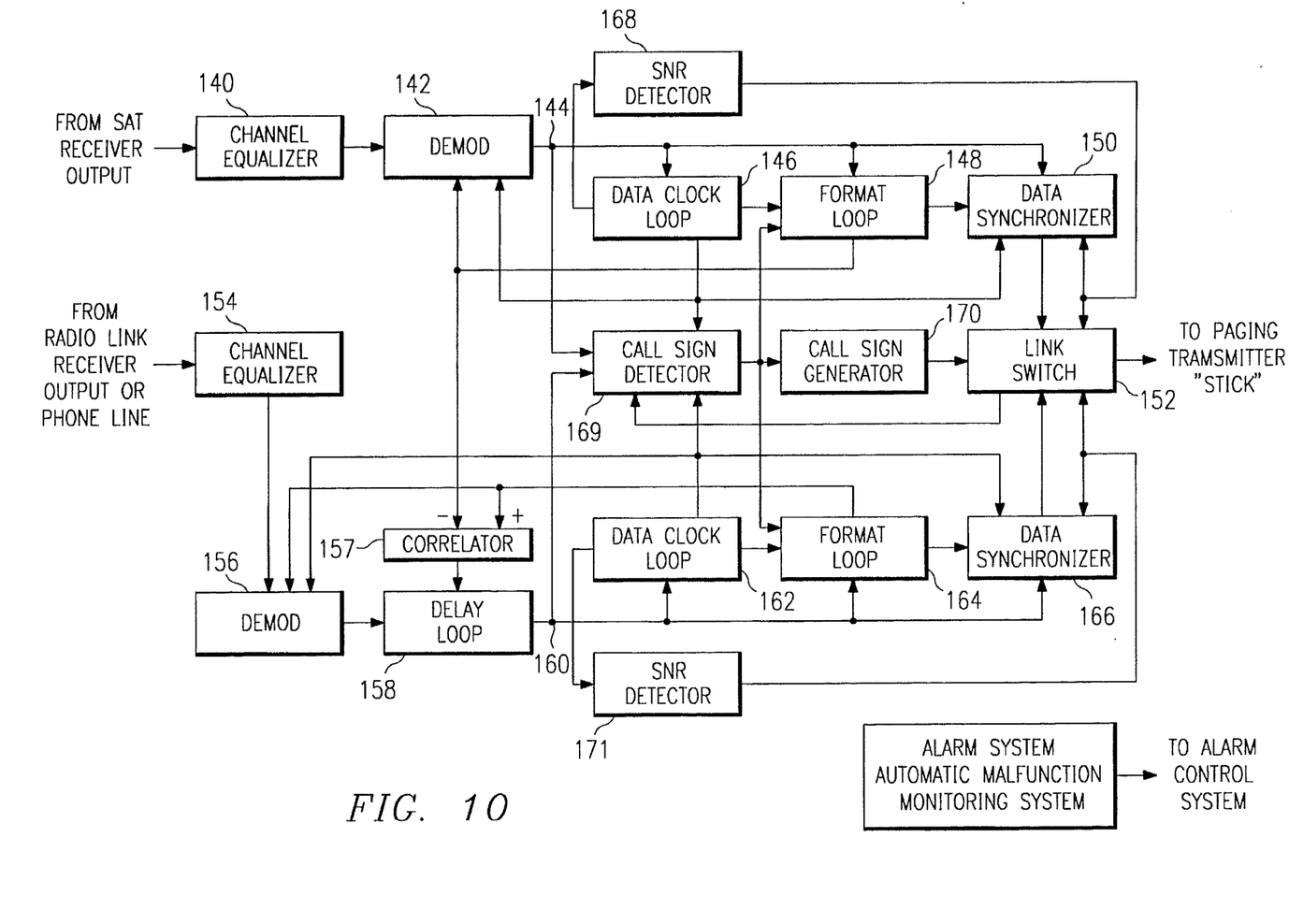
FIG. 10 illustrates a block diagram of the post link receiving signal processor.

Referring now to FIG. 10, there is illustrated a block diagram of the signal processor 116. There are two links provided, one from the satellite receiver 50 and one from the RCL receiver 78. The output of the satellite receiver 50 is a signal at the FSK modulated phone line code level. This is input to a channel equalizer 140 which provides signal conditioning. The output of the channel equalizer 140 is input to a demodulator 142 to demodulate to the base band level on a node 144. The output of the node 144 is input to a data clock loop 146 which is operable to recover the clock from the base band data. The output of the clock is input to the demodulator circuit 142 and also to the input of a format loop circuit 148 which is operable to demodulate the data format from the base band data. This also is output to the demodulator 142. The output of the format loop 148 is input to a data synchronizer 150, which also receives as an input the clock from the data clock loop 146 and also the base band data. The data synchronizer 150 is operable to resynchronize the data and output the synchronized data to a link switch 152.

The data from the RCL 78 is input to a channel equalizer 154 similar to the channel equalizer 140. The output of channel equalizer 154 is input to a demodulator 156, similar to demodulator 142. The output of demodulator 156 is input to a delay loop 158, the output of which provides a delayed base band signal on a node 160. The delayed base band signal is input to a data clock loop circuit 162 to recover the clock from the base band data. This is similar to the data clock loop 146. The output of data clock loop 162 is also input to a format loop circuit 164 which also receives the base band data and is operable to demodulate the data format from the base band data. The output of the format loop circuit 164 is input to a data synchronizer 166 similar to data synchronizer 150, the output of which provides synchronized data for input to the link switch 152.

The base band data from node 144 and the base band data from node 160 are input to a call sign detector; circuit 168 to detect the call sign that is embedded on the data. This is output to a call sign generator 170 and also to both of the format loop circuits 148 and 164. The output of the call sign generator 170 is input to the link switch 152. Link switch 152 also is connected back to the input of call sign detector 168.

The format loop 164 and the format loop 148 circuits have the outputs thereof input to a correlatoe 169. The correlatoe 169 adjusts the delay loop 158 as a function of the difference of the outputs of the two format loop circuits 148 and 164. In this manner, the base band data and data at node 160 is adjusted relative to the data at node 144 such that there is virtually no time difference between the two. This is a result of the cyorrelatoe 169 receiving the two synchronous format patterns from the format loop circuits 148 and 164 and correlating them.

The output of the data clock loop 146 is input to a signal-to-noise ratio detector 168 to detect the signal-to-noise ratio of the received signal from the satellite receiver 50. This provides a control input to both the link switch 152 and also provides an input to the data synchronizer 150. In a similar manner, the output of data clock loop 162 is input to a similar signal-to-noise ratio detector 170 to detect the signal-to-noise ratio of the RCL link from receiver 78. This also provides a control input to link switch 152 and also to data synchronizer 166.

The link switch 152 in operation in an arbiter between the two channels. When the signal-to-noise ratio for the satellite receiver 50 is above a predetermined level, the link switch 152 will select the output of data synchronizer 150. However, if the signal-to-noise ratio falls below the predetermined level, the link switch 152 will select the output of data synchronizer 166 provided that a sufficient signal-to-noise ratio exists on the RCL data link. If not, this indicates that both the satellite receiver and the RCL link have failed and, therefore, no data should be transmitted. The link switch 152 selects the satellite receiver as the preferential data link and, if it fails, it selects the RCL data link. If no data link is present, no output is provided to the paging transmitter 52.

The delay loop 158 provides time synchronization between the data on the node 144 and the node 160 at the base band level. In this manner, if the signal-to-noise ratio of the satellite link falls below the predetermined level, the link switch 152 can switch over to the RCL data link with no time difference required between the data. This is due to the fact that the delay loop 158 is operable to continually adjust the delay between the output of the demodulator 156 and the base band node 160. Whenever the link switch 152 switches over to the RCL data link, the delay in the delay loop 158 is stored. In this manner, no manual adjustment of delay is required, nor is any remote adjustment of the delay required, since the signal from the satellite receiver, when operable, provides a time base to all of the remotely disposed RCL receivers 78.

Referring now to FIG. 11, there is illustrated a block diagram of the correlator 169 and delay loop 158. The frame signal from the format loop 148 for the satellite receiver portion of the system is input to one input of an AND gate 180, the other input of which is connected through an inverted input to the frame output of the format loop 164 from the RCL side of the system. Similarly, the frame output of format loop 164 is input, to one input of an AND gate 182, the other input of which is connected through an inverting input to the frame output of the format loop 148. The output of AND gate 180 is input to the "D" input of an up/down counter 184, the "U" input thereof connected to the output of D gate 182. The output of 3D gate 182 and the output of AND gate 180 are input to the two separate inputs of an OR gate 186. The output of OR gate 186 is input to a modulo-M counter 188.

The output of the up/down counter 184 is input to one input of an adder 190. The output of the adder 190 is input to a hold register 192. The output of which is input to the other input of the adder 190. The output of the hold register 192 is also input to the address input of a one-of-N multiplexer 194. The data input to the multiplexer 194 is received from an N-stage register 196 which receives on a serial input thereto the data from the RCL side of the system. The one-of-N multiplexer 194 determines which output is selected from the N-stage register 196 to provide on the output thereof the delayed data for the RCL portion of the system which is input to the node 160.

In operation, modulo-M counter is operable to average the output of the OR gate 186. The output of OR gate 186 is representative of a pulse which indicates an up count whenever the frame signal for the RCL side lags the frame signal for the Satellite Control Link "SCL" side and the down correct signal is generated whenever the frame signal for the RCL side leads the frame signal for the SCL side. The averaging operation is continued for M counts of the up/down counter 184. The adder 190 then adds to the present count the number of counts that the present count differs from the received data, thus resulting in the delayed operation. The output of the modulo-M counter 188 is input to the clock input of the hold register 192 to indicate the end of the averaging operation and to latch the output of the adder 190 to the address input of the one-of-N multiplexer 194. Similarly, the hold register 192 is enabled only when the signal-to-noise ratio of the SCL side is above the predetermined threshold. When it falls below the predetermined threshold, the contents of the hold register 192 are maintained.

In summary, there has been provided a paging system utilizing a satellite based system that provides a direct control link to paging transmitters. The paging transmitters are disposed on towers at various paging sites in a region. A satellite receiver is provided for receiving paging information to be transmitted to pagers in the region by directly broadcasting to the towers as opposed to through a radio control link, the time base for all the transmitters being substantially zero.

Although the preferred embodiment has been described in detail, it should be understood that various changes, substitutions and alterations can be made therein without departing from the spirit and scope of the invention as defined by the appended claims.

What is claimed is:

1. A paging system, comprising:

a satellite having a predetermined footprint for generating timing information and transmitting said timing information on a downlink channel;

a plurality of paging sites disposed in the footprint of said satellite;

a plurality of satellite receivers, one of said satellite receivers disposed at each of said paging sites for receiving at least the timing information from said satellite, said timing information received at each of said satellite receivers at substantially the same time;

a paging source for generating paging information and transmitting it to each of said paging sites;

a paging receiver disposed at each of said paging sites for receiving said paging information;

a paging transmitter disposed at each of said paging sites for transmitting said received paging information on a paging frequency in accordance with said received timing information within a predetermined locale proximate to each of said paging sites for reception by a paging receiver within said paging locale; and said predetermined locales for substantially all adjacent ones of said paging sites having substantial overlap such that if one of said paging transmitters fails in its associated predetermined locale, said paging transmitters at the adjacent ones of said paging sites will provide sufficient field strength to be received by a paging receiver in substantially all locations within the predetermined locale associated with the failed one of said paging transmitters.

2. A method for transmitting paging information from a paging information source to mobile paging receivers, comprising the steps of:

providing a satellite having a predetermined footprint;

transmitting at least timing information from the satellite on a downlink channel within the footprint of the satellite;

providing a plurality of paging sites within the footprint of the satellite;

receiving the transmitted timing information from the downlink at each of the paging sites, the timing information received at each of the paging sites at substantially the same time;

transmitting paging information from the paging information source to each of the paging sites;

receiving the paging information at each of the paging sites;

transmitting the paging information in accordance with the received timing information on a paging frequency from each of the paging sites within a predetermined locale proximate to each of the paging sites for reception by the mobile paging receiver when the paging receiver is within one of the predetermined locales associated with the paging sites; and each of the predetermined locales for adjacent ones of substantially all of the paging sites having substantial overlap such that if transmission of the paging information on the paging frequency from any of the paging sites fails, transmission of the paging frequency at the adjacent ones of the paging sites will provide sufficient field strength to be received by the mobile paging receiver in substantially all locations within the predetermined locale associated with the failed one of the paging sites.

\* \* \* \* \*